United States Patent [19]
Fukui et al.

[11] Patent Number: 5,447,268
[45] Date of Patent: Sep. 5, 1995

[54] METHOD OF FUSING COMMUTATOR RISERS TO ARMATURE COIL IN ELECTRIC MOTOR

[75] Inventors: Masashi Fukui, Tochigi; Atsushi Shimura, Gunma; Takayoshi Sakamoto, Kanagawa; Yutaka Hoshino, Gunma, all of Japan

[73] Assignee: Mitsuba Electric Manufacturing Co., Ltd., Gunma, Japan

[21] Appl. No.: 244,535

[22] PCT Filed: Oct. 1, 1993

[86] PCT No.: PCT/JP93/01411

§ 371 Date: Aug. 25, 1994

§ 102(e) Date: Aug. 25, 1994

[87] PCT Pub. No.: WO94/09550

PCT Pub. Date: Apr. 28, 1994

[30] Foreign Application Priority Data

Oct. 8, 1992 [JP] Japan .................. 4-296292

[51] Int. Cl.[6] ............... H02K 13/04; H01R 39/32; H01R 43/06
[52] U.S. Cl. ................. 228/179.1; 228/180.1; 228/212; 29/597
[58] Field of Search ............ 228/179.1, 180.1, 212, 228/6.2, 44.7; 29/597, 598, 733; 219/56.1

[56] References Cited

U.S. PATENT DOCUMENTS

| 3,781,981 | 1/1974 | Miura et al. | 29/597 |
| 3,911,563 | 10/1975 | Anderson | 29/597 |
| 4,670,971 | 6/1987 | Allen et al. | 29/597 |

FOREIGN PATENT DOCUMENTS 4-161040  6/1992  Japan .

Primary Examiner—Samuel M. Heinrich
Attorney, Agent, or Firm—Oliff & Berridge

[57] ABSTRACT

A method which permits easy fusion of commutator risers to armature coils of an electric motor. When there are 20 risers, for example, 10 through-holes are formed in the boss portion of the armature core of the motor, each through-hole being so sized that the back surfaces of two adjacent risers are exposed through each through-hole. Sub-electrodes are inserted into the through-holes such that each sub-electrode supports the back side of the two risers exposed through the through-hole which receives this sub-electrode. First and second main electrodes are so arranged that the first electrode contacts with the first riser of the first riser group exposed through the first through-hole while the second main electrode contacts the second riser of the sixth riser group exposed through the sixth through-hole. After conducting fusing on these risers, the main electrodes are shifted into contact with the risers which are the second as counted from the risers which have just been fused, and fusion is conducted on these risers. This operation is repeated until all the risers are fused.

3 Claims, 4 Drawing Sheets

METHOD OF FUSING COMMUTATOR RISERS TO ARMATURE COIL IN ELECTRIC MOTOR

BACKGROUND OF THE INVENTION

1. Field of the Invention

The present invention relates to a method of fusing commutator risers to an armature coils in an electric motor which is used, for example, in automotive electric parts.

2. Description of the Related Arts

In general, production of an electric motor of the kind described necessitates fusing an armature coils on an armature core to risers of a commutator. FIG. 5 illustrates a conventional method for accomplishing such fusing of commutator risers. According to this conventional method, a sub-electrode 6 is placed in contact with the outer peripheral surface of the commutator 4, and a plurality of main electrodes 7 which are radially arranged around the sub-electrode 6 are pressed onto the risers 5, thereby fusing the risers to the armature coil. This arrangement, however, requires anvil or support members 10 which are placed between the commutator and the armature coil, in order to receive the pressure exerted through the main electrodes 7. Consequently, the number of parts is increased so as to raise the cost. In addition, these support members 7 cannot satisfactorily receive the pressure. Furthermore, since the main electrodes 7 are arranged in a side-by-side fashion around the sub-electrode 6, it is necessary that the risers 5 have a large radial height, and the configuration of the armature core has to be determined in such a manner as to provide a space for accommodating the main electrodes 7, which undesirably limits the degree of freedom of design of the armature core.

In order to obviate this problem, a method as shown in FIGS. 6A to 6C in which through holes 3c are formed in the core part of the armature core 3, and sub-electrodes 6 (or riser support members) are inserted through these through holes 3c into contact with the back pressed onto the risers 5 which are backed by the sub-electrodes 6, thus accomplishing the fusing. This method, however, has a drawback in that, since no definite relationship is determined between the positions of the through holes 3c and the positions of the risers 5, some of the risers 5 may be hidden behind the ribs 3d which are positioned between the adjacent through holes 3c. It is therefore necessary to use an L-shaped specific sub-electrode 6 to back up such a riser 5. In addition, a troublesome work is required to circumferentially rotate such sub-electrode towards the riser 5 hidden behind the rib 3d. Thus, the method shown in FIGS. 6A to 6C is still unsatisfactory and needs improvement.

SUMMARY OF THE INVENTION

Accordingly, it is a primary object of the present invention is to provide a method of fusing commutator risers to a stator coil of an electric motor, which is improved to overcome all these problems of the known art.

To this end, according to one aspect of the present invention, there is provided a method of fusing risers projecting from a commutator of an electric motor to armature coils of the motor, comprising: setting the number A of the risers to a value which has at least one whole number submultiple greater than one; forming through-holes in the boss of the armature core of the motor, the number of the through holes being equal to the number obtained through division of the number A of the risers by one M of the submultiples, each through-hole being so sized that M pieces of the risers are axially exposed through the through-hole; inserting riser support members into respective through-holes, the riser support members being so sized as to simultaneously contact all the risers exposed through each through-hole; arranging N pieces of main electrodes, N being equal to or different from M, such that one main electrode is associated with one of the A/N groups of the risers and such that the main electrodes associated with the different groups of risers contact with the risers which are in the associated groups of risers and which are on different orders of risers in the respective groups of risers; effecting fusing on the risers contacted by the main electrodes; shifting the main electrodes into contact with the risers which are N-th risers as counted from the risers which have just been fused by the respective risers; and repeating the fusion and shifting sequentially until all the risers are fused.

According to this method, it is possible to easily fuse the commutator risers to the armature coil, regardless of the configurations of the risers and the armature coil.

The above and other objects, features and advantages of the present invention will become more clear from the following description of the preferred embodiments when the same is read in conjunction with the accompanying drawings.

DESCRIPTION OF THE PREFERRED EMBODIMENTS

Figure 1:
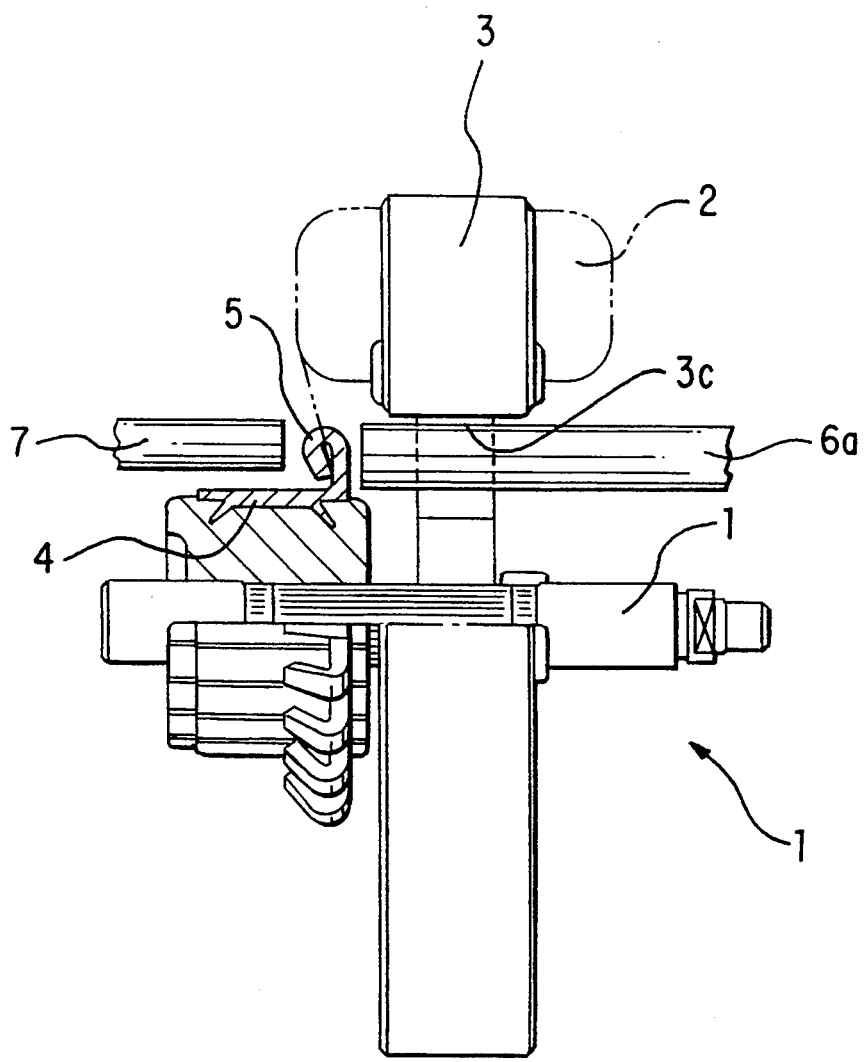
FIG. 1 is a partly-sectioned side elevational view of an armature of an electric motor showing the manner in which commutator risers are fused to the armature coil of the motor.
Figure 2:
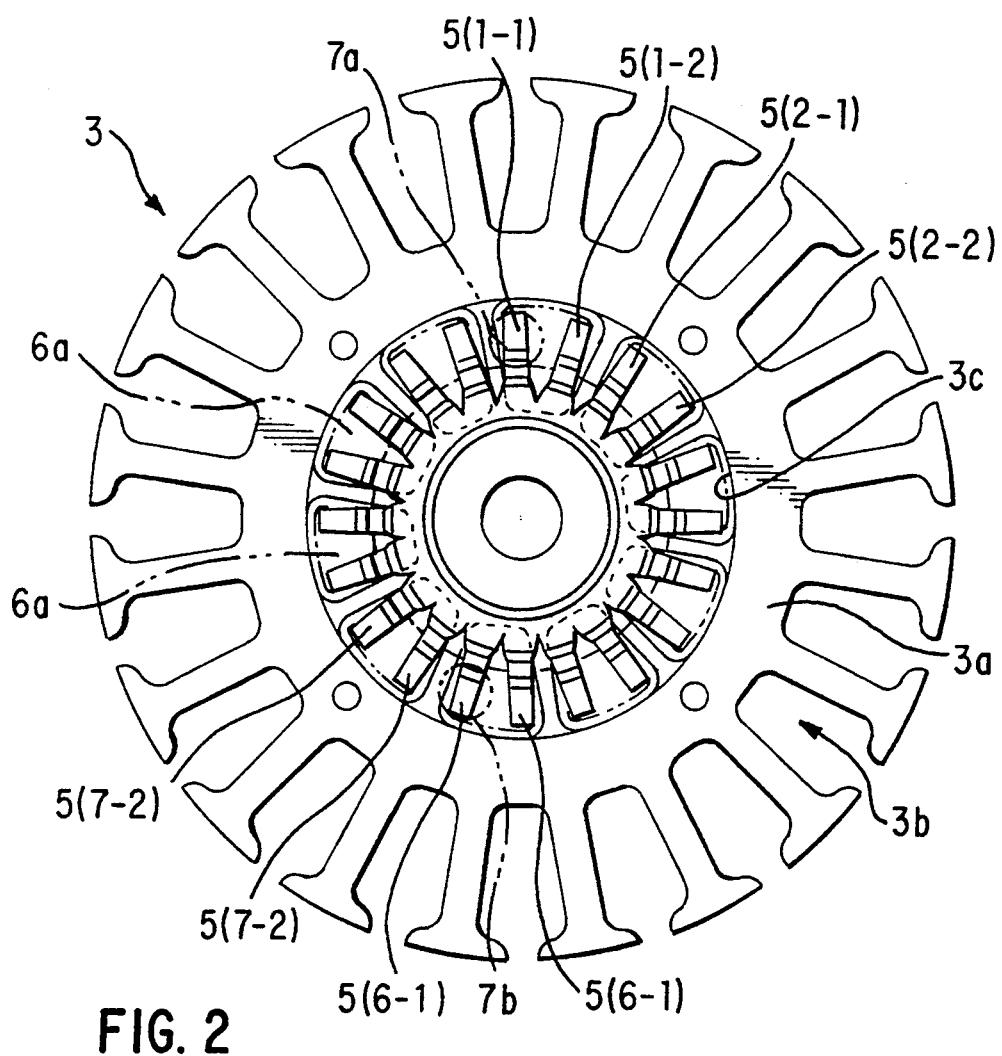
FIG. 2 is a top plan view of the armature shown in FIG. 1.
Figure 3:
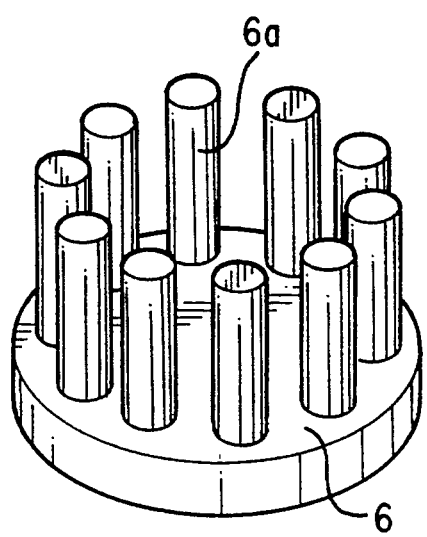
FIG. 3 is a perspective view of a sub-electrode unit.

An embodiment of the present invention will be described with reference to the drawings, specifically to FIGS. 1 to 3. Referring to these Figures, an electric motor for use in an automotive electric component has an armature 1 which includes, as well known to those skilled in the art, an armature core 3, armature coils 2 wound on the core 3, and a commutator 4 which are integrally carried by an armature shaft 1a.

The armature core 3 has a laminate structure composed of a plurality of layers of core sheets each having a boss portion 3a and a plurality of outer peripheral slots 3b. Ends of the armature coils 2 leading from the slots 3b are fused to risers 5 projecting from the commutator 4 in a manner which will be described later. In the illustrated embodiment, the numbers A of the slots 3b and the risers 5 are respectively 20 (twenty). Thus, the number A in this case has a submultiple "2". There are 10 (ten) through holes 3c formed in the boss 3a of the armature core 3, such that each through hole 3c confronts two adjacent risers 5. Thus, the number of the through holes 3c equals to "A/2". Consequently, the back surfaces of all risers 5 are exposed through ten through holes 3c.

A sub-electrode assembly 6 carries 10 (ten) sub-electrodes 6a. The sub-electrode assembly 6 serves as the riser support member in the present invention. The sub-electrode 6 is mounted on the armature coil 3 such that the sub-electrodes 6a extend through the through-hole s 3c, each sub-electrode 6a contacting the back surfaces of two adjacent risers 5. Consequently, all the risers 5 are backed up by the ten sub-electrodes 6a. Numeral 7a denotes a main electrode assembly having a pair of, i.e., first and second, main electrodes 7a and 7b. The pair of risers 5 exposed through each through hole 3c is defined as a group of risers, so that there are 10 riser groups, i.e., first to tenth groups, employed in the illustrated embodiment. The first riser group and the sixth riser group are arranged in symmetry with respect to the motor axis. The arrangement is such that the first main electrode 7a contacts the first one (1—1) of the two risers 5 of the first group, while the second main electrode 7b contacts the second one (6-2) of the two risers 5 of the sixth group.

The fusing of the armature coils 2 to the risers 5 is conducted by inserting the sub-electrodes 6a into the through holes 3c into contact with the back surfaces of the risers 5 as described before. In this state, the first and second main electrodes 7a and 7b are respectively brought into pressure contact with the first riser (1—1) of the first riser group and the second riser (6-2) of the sixth riser group, thereby fusing these risers to the armature coils. Then, the main electrode assembly 7 is rotated so as to bring the main electrodes 7a and 7b into alignment with the second ones from the risers (1—1) and (6-2), i.e., to the first one (2-1) of the two risers 5 in the second riser group and the second one (7-2) of the two risers 5 of the seventh riser group so as to effect fusing on these risers. This operation is repeated until the main electrode assembly 7 makes one full rotation, whereby fusing is conducted on all the risers 5.

In the embodiment as described, the fusion between the armature coils 2 and the risers 5 is achieved by using the sub-electrodes 6a and the main electrodes 7a, 7b. It will be understood that fusion can be effected on all these risers 5 merely by rotating the main electrode assembly 7 such that the main electrodes 7a, 7b are brought into pressure contact with successive risers while keeping the sub-electrodes 6a inserted into the through holes 3c of the armature core 3.

As will be understood from the foregoing description, according to the present invention, the pressing force exerted by the main electrodes 7a, 7b are received by the sub-electrodes 6a which back up the risers 5. In addition, there is no need for preserving any space around the commutator 4 for receiving both the main and sub-electrodes. In the illustrated embodiment, 10 through holes 3c, each being sized to confront two risers which are adjacent to each other at a time, are formed in the armature core 3, so that all the risers 5 are contacted and backed by the 10 sub-electrodes 6a received in the through holes 3c. Consequently, the problem encountered with known arts due to hiding of risers behind the ribs formed between the through holes 3c is avoided, which eliminates the troublesome work necessitated in known arts such as the use of L-shaped specific sub-electrodes and shift of such sub-electrodes, contributing greatly to the improvement in the efficiency of the assembly work.

Furthermore, the main electrodes 7a and 7b are arranged such that they can respectively be pressed onto, for example, the first and second risers (1—1) and (6-2) of the first and second riser groups which are in symmetry with each other with respect to the motor axis, so that fusion is conducted on these two risers first. The main electrode assembly is then rotated to bring the main electrodes 7a, 7b into contact with every other riser 5 as counted from the risers which have just been fused, so that fusion is completed on all the risers 5 in one full rotation of the main electrode assembly 7, thus attaining a remarkable improvement in the efficiency of the work. It is to be noted that, since the fusing is conducted on every other risers 5, cooling of the fused risers is promoted as compared with the case where adjacent risers 5 are successively fused, thus eliminating occurrence of troubles such as defective fusion.

Obviously, the embodiment described hereinbefore is only illustrative. For instance, although there are 20 risers 5 in the described embodiment, the invention can be carried out also on such a motor that has, for example, 21 (twenty-one) risers. In such a case, the number A of the risers is 21 which has a submultiple "3". In such a case, seven (21/3) through-holes 3c are formed in the boss 3a of the armature core 3, each through-hole 3c being so sized that three risers 5 are simultaneously exposed through each through hole 3c. On the other hand, seven sub-electrodes 6a in total, each being capable of simultaneously contacting three risers 5, are provided on the sub-electrode assembly 6, while the main electrode assembly 7 is provided with three, i.e., first, second and third, main electrodes. The arrangement is such that these three main electrodes contact, respectively, the first (1), second (2) and the third (3) risers of three different riser groups each having three risers. After fusion is completed on these three risers 5, the main electrode assembly 7 is so rotated that the main electrodes are brought into alignment with the third ones as counted from the risers 5 which have just been fused by the respective main electrodes, and these risers 5 newly contacted by the main electrodes are fused. This operation is repeated until all the risers are fused. It will be clear that the described arrangement offers the same advantages as those produced by the first embodiment described before.

Figure 4:
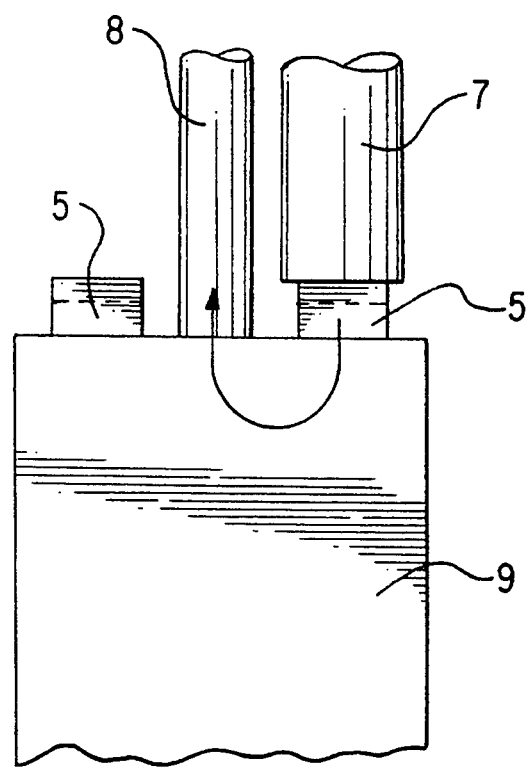
FIG. 4 is an enlarged view of a portion of an electric motor, illustrative of a second embodiment.
Figure 5:
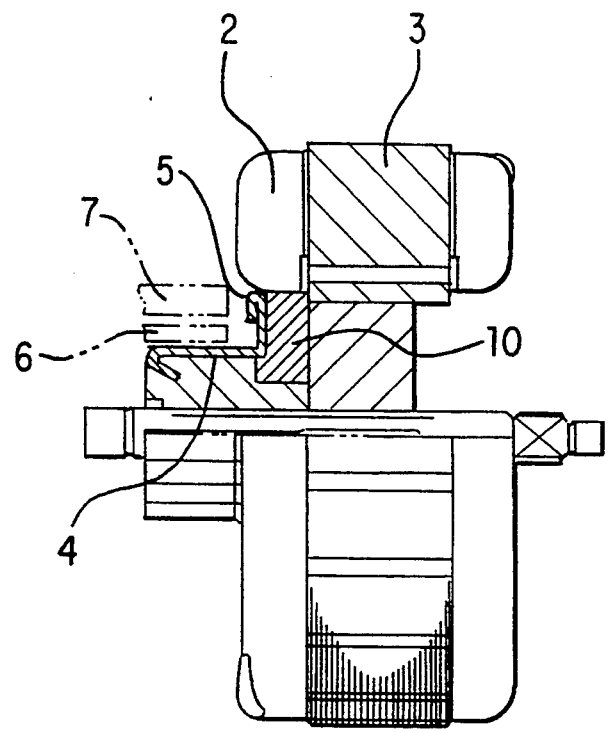
FIG. 5 is a partly-sectioned side elevational view of an armature of an electric motor, illustrative of a conventional method of fusing commutator risers to the armature coil.
Figure 6A:
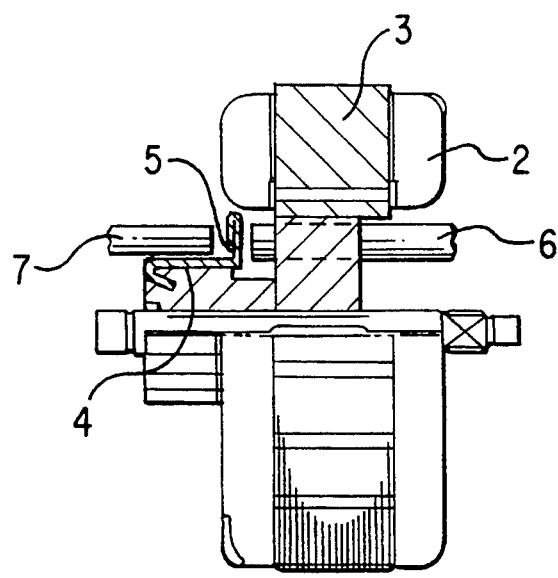
FIGS. 6A to 6C are a side elevational view, an axial end view and a perspective view of an armature of an electric motor, illustrative of another conventional method.
Figure 6B:
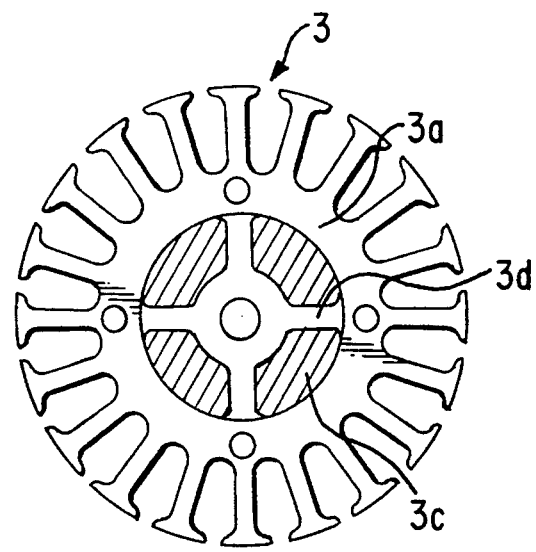
Figure 6C:
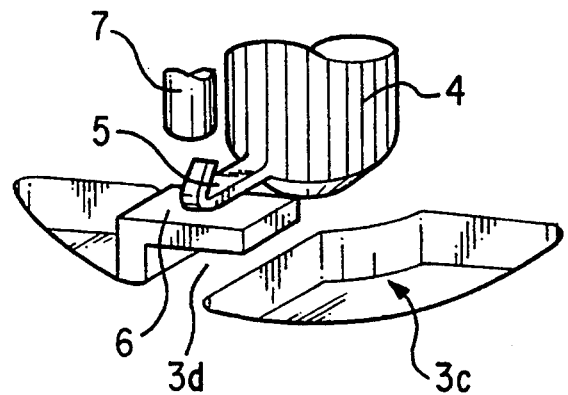

Although the sub-electrodes function as the riser supporting members in the embodiments described hereinbefore, this feature is not exclusive and riser support members separate from the sub-electrodes may be used as in a second embodiment shown in FIG. 4. More specifically, in the second embodiment shown in FIG. 4, the riser support members 9 serve as back-up electrodes. In this embodiment, a closed loop for electrical current is formed to include the main electrode 7, riser 5, back-up electrode 9 and a sub-electrode 8 which is held in contact with a portion of the back-up electrode 9 between two adjacent risers 5.

As will be understood from the foregoing description, according to the present invention, through-holes of a number which is obtained by dividing the number A of the risers by a submultiple M are formed in the boss of the armature core, each through-hole being so sized that M pieces of the risers are simultaneously exposed therethrough. Consequently, all the risers are supported by the riser support members received in the respective through-holes.

Consequently, the problem encountered with known arts due to hiding of risers behind the ribs formed between the through holes 3c is avoided, which eliminates the troublesome work necessitated in known arts such as the use of L-shaped specific sub-electrodes and shift of such sub-electrodes, contributing greatly to the improvement in the efficiency of the assembly work.

Furthermore, the arrangement is such that N pieces of main electrodes, N being a submultiple of the number A of the risers, contact the risers which are in different riser groups and which are of different orders of the risers in the respective riser groups. After these risers are fused, the main electrode assembly is rotated to bring the main electrodes to the positions of the risers which are N-th as counted from the risers which have just been fused by the respective main electrodes. Consequently, all the risers can be fused in one full rotation of the main electrode assembly, thus realizing a remarkable improvement in the efficiency of the assembly work. Furthermore, since the main electrodes skips to the N-th residers from the riser which have just been fused, the cooling of the fused risers is promoted as compared with the case where the adjacent risers are successively fused, thus suppressing generation of troubles such as inferior fusing of the risers.

What is claimed is:

1. A method of fusing risers projecting from a commutator of an electric motor to armature coils of said motor, comprising the steps of:
    setting a number A of said risers to a value which has at least one whole number submultiple greater than one;
    forming a plurality of through-holes in a boss of an armature core of said motor, the number of said through holes being equal to a number M obtained through division of the number A of said risers by one of said submultiples, each of said plurality of through-holes being so sized that M number of said risers forming respective groups of risers are axially exposed through said through-holes and are in contact with the armature coils of said motor;
    inserting riser support members into each of said through-holes, each of said riser support members being sized so as to simultaneously contact all the risers exposed through each of said through-holes;
    arranging a number N of main electrodes, such that each of said main electrodes is associated with one of the through-holes and each of the main electrodes is in contact with one of said risers which is on a different order of said risers in each of the respective groups of risers;
    effecting fusing of the risers contacted by said main electrodes to the armature coils;
    shifting each of said main electrodes into contact with the risers which are an N-th number of risers away from the risers which have just been fused; and
    repeating the fusion and shifting steps sequentially until all the risers are fused.

2. A method of fusing risers projecting from a commutator of an electric motor to armature coils of said motor, comprising the steps of:
    setting a number A of said risers to an even number which has "2" as a submultiple;
    forming a plurality of through-holes in a boss of an armature core of said motor, the number of said through holes being equal to A/2, each of said plurality of through-holes sized so that two of said risers forming groups of risers are axially exposed simultaneously through each of said plurality of through-holes;
    inserting riser support members into each of said through-holes, each of said riser support members being sized so as to simultaneously contact all the risers exposed through each of said through-holes;
    arranging first and second main electrodes such that the first and second main electrodes are associated with two of said groups of risers which are symmetrical with each other with respect to an axis of the motor such that the first main electrode contacts with a first one of the two risers in a first one of said two groups of risers while the second main electrode contacts a second one of the two risers in a second one of said two groups of the risers;
    effecting fusion of said risers contacted by said first and second main electrodes;
    shifting each of said main electrodes into contact with risers which are a second number of risers as counted from the risers which have just been fused by the first and second main electrodes; and
    repeating the fusion and shifting steps until all the risers are fused.

3. A method of fusing risers projecting from a commutator of an electric motor to armature coils of said motor, comprising the steps of:
    setting a number A of said risers to a value which which has "3" as a submultiple;
    forming a plurality of through-holes in a boss of an armature core of said motor, the number of said through holes being equal to A/3, each of said plurality of through-holes sized so that three of said risers forming groups of said risers are axially exposed simultaneously through each of said through-holes;
    inserting riser support members into each of said through-holes, each of said riser support members being sized so as to simultaneously contact all the risers exposed through each of said through-holes;
    arranging first to third main electrodes such that the first to third main electrodes are associated with three different ones of said groups of risers such that the first, second and third main electrodes respectively contact with a first, a second and a third riser of the respective groups of the risers;
    effecting fusion on said risers contacted by each of said main electrodes;
    shifting each of said main electrodes into contact with risers which are a third number of risers as counted from the risers which have just been fused by each of the main electrodes; and
    repeating the shifting and fusion until all the risers are fused.

* * * * *